(12) United States Patent
Knight et al.

(10) Patent No.: US 6,365,088 B1
(45) Date of Patent: Apr. 2, 2002

(54) ELECTRET TREATMENT OF HIGH LOFT AND LOW DENSITY NONWOVEN WEBS

(75) Inventors: Preston Biggers Knight, Corinth, MS (US); David Lewis Myers, Cumming, GA (US); John Joseph Lassig, Lawrenceville, GA (US); David Grant Midkiff, Alpharetta, GA (US); Rick Leon Busby, Marietta, GA (US); Anthony Lee Lamanac, Woodstock, GA (US); Leonid Anthony Turkevich, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/339,761

(22) Filed: Jun. 24, 1999

Related U.S. Application Data

(60) Provisional application No. 60/090,716, filed on Jun. 26, 1998.

(51) Int. Cl.$^7$ ................................................ H05F 3/00
(52) U.S. Cl. ...................... 264/436; 246/438; 246/484; 425/174.8 E
(58) Field of Search ................................. 264/436, 438, 264/439, 440, 448, 449, 484; 425/174.8 E, 174.8 R

(56) References Cited

U.S. PATENT DOCUMENTS

| | | |
|---|---|---|
| 668,791 A | 2/1901 | Blake et al. |
| 813,063 A | 2/1906 | Sutton et al. |
| 859,998 A | 7/1907 | Wentworth |

(List continued on next page.)

FOREIGN PATENT DOCUMENTS

| | | | |
|---|---|---|---|
| CA | 803714 | 1/1969 | ................. 28/5 |
| CA | 1188452 | 6/1985 | |
| DE | 1 084 015 | 9/1957 | ................. 156/276 |

(List continued on next page.)

OTHER PUBLICATIONS

An introduction to Electrostatic Separation, Technical Bulletin, Bulletin 8570, Carpco, Inc.
Electrostatic Separation of Mixed Granular Solids by Oliver C. Ralston, Elsevier Publishing Company, 1961, Chapter IV, "Applications of Electrostatic Separation", pp. 134–234.
Abstract of JP–59 094621 dated May 31, 1984.
Abstract of JP–60 209220 dated Oct. 21, 1985.
Abstract of JP–57 105217 dated Jun. 30, 1982.
Abstract of JP–62 102809 dated May 13, 1987.
Abstract of JP–01 156578 dated Jun. 20, 1998.
"Bonding Process", IBM Technical Disclosure Bulletin, vol. 14, No. 12, May 1972.
Journal of Electrostatics, vol. 21, 1988, Amsterdam NL, pp. 81–98, XP002012022, P. A. Smith & G. C. East: "Generation of Triboelectric Charge in Textile Fibre Mistures, and their use as Air Filters", see document.
J. van Turnhout: Topics in Applied Physics, vol. 33, Chapter 3 "Thermally Stimulated Discharge of Electrets", pp. 81–215 (1980).
J. van Turnhout: Thermally Stimulated Discharge of Polymer Electrets, Chapter 1, pp. 1–24 (1975).
G.M. Sessler: "Electronic Properties of Polymers, Chapter 3" Charge Storage, pp. 59–107.

(List continued on next page.)

*Primary Examiner*—Jan H. Silbaugh
*Assistant Examiner*—Stefan Staicovici
(74) *Attorney, Agent, or Firm*—William W. Letson; Nancy M. Klembus

(57) ABSTRACT

The process of forming an electret nonwoven web, the process including the steps of providing a nonwoven web, generating a DC corona discharge from an apparatus including an anode electrically configured as a parallel device, and subjecting the web to DC corona discharge to form an electret.

20 Claims, 5 Drawing Sheets

U.S. PATENT DOCUMENTS

| | | | |
|---|---|---|---|
| 924,032 A | 6/1909 | Blake | |
| 1,222,305 A | 4/1917 | Kraus | |
| 1,297,159 A | 3/1919 | Hedberg | |
| 1,355,477 A | 10/1920 | Howell | |
| 2,106,865 A | 2/1938 | Bantz et al. | |
| 2,217,444 A | 10/1940 | Hill | |
| 2,328,577 A | 9/1943 | Oglesby | |
| 2,398,792 A | 4/1946 | Johnson | |
| 2,738,067 A | 3/1956 | Cook, Jr. | |
| 2,748,018 A | 5/1956 | Miller | |
| 2,998,051 A | 8/1961 | Sittel | 154/1.7 |
| 3,012,668 A | 12/1961 | Fraas | |
| 3,059,772 A | 10/1962 | Baron | 209/127 |
| 3,125,547 A | 3/1964 | Blatz | 260/45.5 |
| 3,276,944 A | 10/1966 | Levy | 161/150 |
| 3,281,347 A | 10/1966 | Winder | 204/168 |
| 3,323,933 A | 6/1967 | Barford et al. | |
| 3,338,992 A | 8/1967 | Kinney | 264/24 |
| 3,341,007 A | 9/1967 | Mayer et al. | 209/2 |
| 3,341,394 A | 9/1967 | Kinney | |
| 3,349,285 A | 10/1967 | Belkin | 317/2 |
| 3,380,584 A | 4/1968 | Fulwyler | 209/3 |
| 3,402,814 A | 9/1968 | Morel et al. | 209/127 |
| 3,436,797 A | 4/1969 | Graf et al. | 156/272.6 |
| 3,502,538 A | 3/1970 | Petersen | 161/150 |
| 3,502,763 A | 3/1970 | Hartmann | 264/210 |
| 3,542,615 A | 11/1970 | Dobo et al. | 156/181 |
| 3,571,679 A | 3/1971 | Turnout | 317/262 |
| 3,581,886 A | 6/1971 | Singewald et al. | 209/9 |
| 3,692,606 A | 9/1972 | Miller et al. | 156/273.1 |
| 3,692,618 A | 9/1972 | Dorschner et al. | |
| 3,711,898 A | 1/1973 | Debbas | |
| 3,802,817 A | 4/1974 | Matsuki et al. | 425/66 |
| 3,821,021 A | 6/1974 | McMillin | |
| 3,849,241 A | 11/1974 | Butin et al. | |
| 3,855,046 A | 12/1974 | Hansen | |
| 3,859,330 A | 1/1975 | Proskow | 260/47 UA |
| 3,896,802 A | 7/1975 | Williams | 128/156 |
| 3,907,604 A | 9/1975 | Prentice | 136/146 |
| 3,909,009 A | 9/1975 | Cvetko et al. | 274/37 |
| 3,962,386 A | 6/1976 | Driscoll | 264/22 |
| 3,979,529 A | 9/1976 | Rebentisch et al. | 427/25 |
| 3,998,916 A | 12/1976 | van Turnhout | 264/22 |
| 4,011,067 A | 3/1977 | Carey, Jr. | 55/354 |
| 4,013,816 A | 3/1977 | Sabee et al. | 428/288 |
| 4,035,164 A | 7/1977 | Taylor | |
| 4,041,203 A | 8/1977 | Brock et al. | 428/157 |
| 4,058,724 A | 11/1977 | McKinney et al. | |
| 4,070,218 A | 1/1978 | Weber | 156/167 |
| 4,091,140 A | 5/1978 | Harrnon | |
| 4,096,289 A | 6/1978 | Nischwitz et al. | 427/32 |
| 4,103,062 A | 7/1978 | Aberson et al. | 428/283 |
| 4,140,607 A | 2/1979 | Kreiseimeier et al. | 204/168 |
| 4,144,538 A | 3/1979 | Chapman et al. | |
| 4,170,304 A | 10/1979 | Huke | |
| 4,178,157 A | 12/1979 | van Turnhout et al. | 55/155 |
| 4,185,972 A | 1/1980 | Nitta et al. | |
| 4,196,245 A | 4/1980 | Kitson et al. | 428/198 |
| 4,208,366 A | 6/1980 | Kinney | |
| 4,209,563 A | 6/1980 | Sisson | 428/288 |
| 4,215,682 A | 8/1980 | Kubik et al. | 128/205.29 |
| 4,223,677 A | 9/1980 | Anderson | 128/287 |
| 4,273,635 A | 6/1981 | Beraud et al. | 204/165 |
| RE30,782 E | 10/1981 | van Turnhout | 264/22 |
| 4,298,440 A | 11/1981 | Hood | 204/165 |
| 4,305,797 A | 12/1981 | Knoll et al. | |
| 4,307,143 A | 12/1981 | Meitner | 252/91 |
| 4,308,223 A | 12/1981 | Stern | 264/22 |
| 4,310,478 A | 1/1982 | Balslev et al. | |
| 4,323,374 A | 4/1982 | Shinagawa et al. | |
| 4,324,198 A | 4/1982 | Muz | 118/630 |
| 4,340,563 A | 7/1982 | Appel et al. | 264/518 |
| 4,342,812 A | 8/1982 | Selwood | 428/286 |
| 4,353,799 A | 10/1982 | Leonard | 210/321.3 |
| 4,357,234 A | 11/1982 | Inculet et al. | |
| 4,363,682 A | 12/1982 | Thiebault | |
| 4,363,723 A | 12/1982 | Knoll et al. | |
| 4,373,224 A | 2/1983 | Bandai et al. | |
| 4,374,727 A | 2/1983 | Takahashi et al. | |
| 4,374,888 A | 2/1983 | Bornslaeger | 428/198 |
| 4,375,718 A | 3/1983 | Wadsworth et al. | 29/592 |
| RE31,285 E | 6/1983 | van Turnhout et al. | 55/155 |
| 4,392,876 A | 7/1983 | Schmidt | |
| 4,394,235 A | 7/1983 | Brandt et al. | |
| 4,411,795 A | 10/1983 | Olson | 210/679 |
| 4,430,277 A | 2/1984 | Lin | |
| 4,443,513 A | 4/1984 | Meitner et al. | 422/195 |
| 4,443,515 A | 4/1984 | Atlas | 428/224 |
| 4,451,589 A | 5/1984 | Morman et al. | 523/124 |
| 4,455,195 A | 6/1984 | Kinsley | 162/13 |
| 4,455,237 A | 6/1984 | Kinsely | 210/767 |
| 4,456,648 A | 6/1984 | Adamse et al. | 428/283 |
| 4,492,633 A | 1/1985 | Sandulyak et al. | |
| 4,507,539 A | 3/1985 | Sando et al. | 219/121 PY |
| 4,513,049 A | 4/1985 | Yamasaki et al. | |
| 4,514,289 A | 4/1985 | Inculet | |
| 4,517,143 A | 5/1985 | Kisler | |
| 4,534,918 A | 8/1985 | Forrest, Jr. | |
| 4,547,420 A | 10/1985 | Krueger et al. | |
| 4,551,378 A | 11/1985 | Carey, Jr. | 428/198 |
| 4,554,207 A | 11/1985 | Lee | 428/288 |
| 4,555,811 A | 12/1985 | Shimalla | 2/51 |
| 4,588,537 A | 5/1986 | Klaase et al. | 264/22 |
| RE32,171 E | 6/1986 | van Turnhout | 55/155 |
| 4,592,815 A | 6/1986 | Nakao | 204/165 |
| 4,594,626 A | 6/1986 | Frangesh | |
| 4,618,524 A | 10/1986 | Groitzsch et al. | 428/198 |
| 4,622,259 A | 11/1986 | McAmish et al. | 428/171 |
| 4,623,438 A | 11/1986 | Felton et al. | 204/168 |
| 4,626,263 A | 12/1986 | Inoue et al. | |
| 4,652,282 A | 3/1987 | Ohmori et al. | 55/155 |
| 4,652,322 A | 3/1987 | Lim | 156/181 |
| 4,657,639 A | 4/1987 | Mahadevan et al. | |
| 4,657,804 A | 4/1987 | Mays et al. | 428/212 |
| 4,663,220 A | 5/1987 | Wisneski et al. | 428/221 |
| 4,670,913 A | 6/1987 | Morell et al. | 2/227 |
| 4,671,943 A | 6/1987 | Wahlquist | |
| 4,677,017 A | 6/1987 | DeAntonis et al. | 428/214 |
| 4,689,241 A | 8/1987 | Richart et al. | 427/28 |
| 4,699,823 A | 10/1987 | Kellenberger et al. | |
| 4,705,171 A | 11/1987 | Eldridge | |
| 4,707,398 A | 11/1987 | Boggs | 428/224 |
| 4,714,647 A | 12/1987 | Shipp, Jr. et al. | 428/212 |
| 4,720,415 A | 1/1988 | Vander Wielen et al. | 428/152 |
| 4,729,371 A | 3/1988 | Krueger et al. | |
| 4,738,772 A | 4/1988 | Giesfeldt | 209/2 |
| 4,739,882 A | 4/1988 | Parikh et al. | |
| 4,749,348 A | 6/1988 | Klaase et al. | 425/174.8 |
| 4,761,326 A | 8/1988 | Barnes et al. | 428/219 |
| 4,789,504 A | 12/1988 | Ohmori et al. | |
| 4,795,668 A | 1/1989 | Krueger et al. | 428/174 |
| 4,797,201 A | 1/1989 | Kuppers et al. | 209/127.4 |
| 4,797,318 A | 1/1989 | Brooker et al. | |
| 4,810,432 A * | 3/1989 | Kisler | 264/436 |
| 4,818,464 A | 4/1989 | Lau | 264/510 |
| 4,826,703 A | 5/1989 | Kisler | 427/466 |
| 4,831,664 A | 5/1989 | Suda | |
| 4,847,914 A | 7/1989 | Suda | |
| 4,859,266 A | 8/1989 | Akasaki et al. | 156/273.1 |
| 4,863,785 A | 9/1989 | Berman et al. | 428/218 |
| 4,863,983 A | 9/1989 | Johnson et al. | 524/140 |

| | | | |
|---|---|---|---|
| 4,874,399 A | 10/1989 | Reed et al. ................ 55/2 |
| 4,874,659 A | 10/1989 | Ando et al. ................ 428/221 |
| 4,883,052 A | 11/1989 | Weiss et al. |
| 4,886,527 A | 12/1989 | Fottinger et al. ............. 55/156 |
| 4,894,131 A | 1/1990 | Jacobs et al. ............... 204/165 |
| 4,901,370 A | 2/1990 | Suda |
| 4,904,174 A | 2/1990 | Moosmayer et al. |
| 4,917,942 A | 4/1990 | Winters |
| 4,920,168 A | 4/1990 | Nohr et al. ................ 524/188 |
| 4,944,854 A | 7/1990 | Felton et al. ............... 204/168 |
| 4,948,515 A | 8/1990 | Okumura et al. ........... 210/748 |
| 4,948,639 A | 8/1990 | Brooker et al. ............ 428/35.2 |
| 4,960,820 A | 10/1990 | Hwo .......................... 524/528 |
| 4,965,122 A | 10/1990 | Morman ..................... 428/225 |
| 4,983,677 A | 1/1991 | Johnson et al. ............. 525/127 |
| 5,012,094 A | 4/1991 | Hamade |
| 5,021,501 A | 6/1991 | Ohmori et al. ............. 524/544 |
| 5,032,419 A | 7/1991 | Lamirand et al. ........... 427/470 |
| 5,035,941 A | 7/1991 | Blackburn ................. 428/286 |
| 5,051,159 A | 9/1991 | Togashi et al. ............. 204/165 |
| 5,055,151 A | 10/1991 | Duffy |
| 5,057,710 A | 10/1991 | Nishiura et al. ............ 307/400 |
| 5,062,158 A | 11/1991 | Oka et al. ...................... 2/46 |
| 5,077,468 A | 12/1991 | Hamade |
| 5,090,975 A | 2/1992 | Requejo et al. |
| 5,102,738 A | 4/1992 | Bell et al. |
| 5,110,620 A | 5/1992 | Tani et al. ..................... 427/40 |
| 5,112,677 A | 5/1992 | Tani et al. |
| 5,112,690 A | 5/1992 | Cohen et al. |
| 5,118,942 A | 6/1992 | Hamade ..................... 250/324 |
| 5,122,048 A | 6/1992 | Deeds |
| 5,135,724 A | 8/1992 | Dinter et al. |
| 5,138,971 A | 8/1992 | Nakajima et al. |
| 5,143,767 A | 9/1992 | Matsuura et al. |
| 5,149,335 A | 9/1992 | Kellenberger et al. ...... 604/372 |
| 5,156,902 A | 10/1992 | Pieper et al. ................ 604/370 |
| 5,165,979 A | 11/1992 | Watkins et al. ............. 428/113 |
| 5,169,706 A | 12/1992 | Collier, IV et al. ......... 428/152 |
| 5,173,356 A | 12/1992 | Eaton et al. ................ 428/219 |
| 5,178,932 A | 1/1993 | Perkins et al. .............. 428/198 |
| 5,183,701 A | 2/1993 | Jacobs et al. ............... 428/229 |
| 5,188,885 A | 2/1993 | Timmons et al. ........... 428/198 |
| 5,204,174 A | 4/1993 | Daponte et al. ............ 428/286 |
| 5,205,212 A * | 4/1993 | Wolfe ........................ 101/170 |
| 5,206,061 A | 4/1993 | Ando et al. ................ 428/34.7 |
| 5,213,881 A | 5/1993 | Timmons et al. ........... 428/224 |
| 5,213,882 A | 5/1993 | Sassa et al. ................. 428/224 |
| 5,225,018 A | 7/1993 | Zeldin et al. |
| 5,226,992 A | 7/1993 | Morman ..................... 156/62.4 |
| 5,227,172 A | 7/1993 | Deeds |
| 5,230,727 A | 7/1993 | Pound et al. ................ 55/492 |
| 5,232,770 A | 8/1993 | Joseph ........................ 428/284 |
| 5,238,733 A | 8/1993 | Joseph et al. ............... 428/284 |
| 5,244,482 A | 9/1993 | Hassenboehler, Jr. ........ 55/528 |
| 5,246,637 A | 9/1993 | Matsuura et al. |
| 5,247,072 A | 9/1993 | Ning et al. .................. 536/97 |
| 5,254,297 A | 10/1993 | Deeds |
| 5,256,176 A | 10/1993 | Matsuura et al. ............ 55/528 |
| 5,257,982 A | 11/1993 | Cohen et al. ............... 604/378 |
| 5,264,276 A | 11/1993 | McGregor et al. .......... 428/252 |
| 5,284,703 A | 2/1994 | Everhart et al. ............ 428/283 |
| 5,286,326 A | 2/1994 | Greve ...................... 156/272.4 |
| 5,294,482 A | 3/1994 | Gessner |
| 5,306,534 A | 4/1994 | Bosses ...................... 428/35.2 |
| 5,308,674 A | 5/1994 | Zafiroglu ................... 428/102 |
| 5,308,691 A | 5/1994 | Lim et al. ................... 428/286 |
| 5,336,545 A | 8/1994 | Morman ..................... 428/152 |
| 5,350,620 A | 9/1994 | Sundet et al. ............... 428/172 |
| 5,382,400 A | 1/1995 | Pike et al. ................... 264/168 |
| 5,389,202 A | 2/1995 | Everhart et al. ............ 162/103 |
| 5,397,413 A | 3/1995 | Trimble et al. ............. 156/167 |
| 5,401,446 A | 3/1995 | Tsai et al. .................... 264/22 |
| 5,407,581 A | 4/1995 | Onodera et al. ............ 210/654 |
| 5,409,766 A | 4/1995 | Yuasa et al. ................ 428/224 |
| 5,411,576 A | 5/1995 | Jones et al. .................... 95/57 |
| 5,436,033 A | 7/1995 | Mino et al. |
| 5,436,066 A | 7/1995 | Chen ......................... 428/288 |
| 5,441,550 A | 8/1995 | Hassenboehler, Jr. ........ 55/486 |
| 5,443,606 A | 8/1995 | Hassenboehler, Jr. ........ 55/486 |
| 5,455,108 A | 10/1995 | Quincy et al. .............. 428/266 |
| 5,456,972 A | 10/1995 | Roth et al. .................. 428/224 |
| 5,464,688 A | 11/1995 | Timmons et al. |
| 5,468,428 A | 11/1995 | Hanschen et al. |
| 5,472,481 A | 12/1995 | Jones et al. .................... 96/15 |
| 5,482,765 A | 1/1996 | Bradley et al. |
| 5,486,411 A | 1/1996 | Hassenboehler, Jr. ........ 428/286 |
| 5,491,022 A | 2/1996 | Smith ......................... 428/224 |
| 5,493,117 A | 2/1996 | Tamaki et al. .............. 264/483 |
| 5,496,507 A | 3/1996 | Angadjivand et al. ....... 264/423 |
| 5,503,745 A | 4/1996 | Ogata et al. ................ 210/490 |
| 5,552,012 A | 9/1996 | Morris et al. ............. 156/272.4 |
| 5,592,357 A | 1/1997 | Rader et al. |
| 5,620,785 A | 4/1997 | Watt et al. .................. 428/219 |
| 5,627,376 A | 5/1997 | Jaisinghani et al. ......... 250/325 |
| 5,637,165 A | 6/1997 | Chen ......................... 156/62.2 |
| 5,643,524 A | 7/1997 | Gilbert De Cauwer et al. |
| 5,643,525 A | 7/1997 | McGinty et al. |
| 5,658,640 A * | 8/1997 | Berrigan et al. ............ 428/152 |
| 5,667,562 A | 9/1997 | Midkiff |
| 5,686,050 A | 11/1997 | Wadsworth et al. |
| 5,688,157 A | 11/1997 | Bradley et al. ............. 442/340 |
| 5,688,465 A | 11/1997 | Myers |
| 5,709,735 A | 1/1998 | Midkiff et al. |
| 5,721,180 A | 2/1998 | Shipp et al. |
| 5,730,923 A | 3/1998 | Hassenboehler |
| 5,736,473 A | 4/1998 | Cohen et al. |
| 5,762,857 A | 6/1998 | Weng et al. |
| 5,807,366 A | 9/1998 | Milani |
| 5,814,570 A | 9/1998 | Cohen |
| 5,817,584 A | 10/1998 | Singer et al. |
| 5,821,178 A | 10/1998 | Cohen |
| 5,830,810 A | 11/1998 | Cohen |
| 5,834,384 A | 11/1998 | Cohen et al. |
| 5,834,386 A | 11/1998 | Cohen |
| 5,873,968 A | 2/1999 | Shipp et al. |
| 5,877,099 A | 3/1999 | Cohen |
| 6,001,299 A * | 12/1999 | Kawabe et al. ............. 264/436 |

FOREIGN PATENT DOCUMENTS

| | | |
|---|---|---|
| DE | 4 447 152 | 7/1995 |
| EP | 0 125 851 | 11/1984 |
| EP | 0 156 160 | 10/1985 |
| EP | 0 245 108 | 11/1987 |
| EP | 0 334 829 | 9/1989 |
| EP | 0 337 662 | 10/1989 |
| EP | 0 375 234 | 6/1990 |
| EP | 0 391 725 | 10/1990 |
| EP | 0 444 671 | 9/1991 |
| EP | 0 462 574 | 12/1991 |
| EP | 0 478 011 | 4/1992 |
| EP | 0 497 072 | 8/1992 |
| EP | 0 520 798 | 12/1992 |
| EP | 0 550 029 | 7/1993 |
| EP | 0 575 629 | 12/1993 |
| EP | 0 576 738 | 1/1994 |
| EP | 0 594 123 | 4/1995 |
| EP | 0 729 161 | 8/1996 |
| EP | 0 754 796 | 1/1997 |
| GB | 2 026 379 | 2/1980 |
| GB | 2 242 142 | 9/1991 |
| JP | 58-076118 | 7/1958 |
| JP | 62-053719 | 8/1987 |

| | | |
|---|---|---|
| JP | 62-074423 | 9/1987 |
| JP | 1-246413 | 10/1989 |
| JP | 02263420 | * 10/1990 |
| JP | 5-064713 | 3/1993 |
| WO | 81/03265 | 11/1981 |
| WO | 90/11784 | 10/1990 |
| WO | 91/08254 | 6/1991 |
| WO | 92/16681 | 10/1992 |
| WO | 93/06168 | 4/1993 |
| WO | 93/09156 | 5/1993 |
| WO | 94/00166 | 1/1994 |
| WO | 94/01068 | 1/1994 |
| WO | 95/05232 | 2/1995 |
| WO | 95/05501 | 2/1995 |
| WO | 95/22646 | 8/1995 |
| WO | 96/00093 | 1/1996 |
| WO | 96/28597 | 9/1996 |
| WO | 97/04155 | 2/1997 |

OTHER PUBLICATIONS

Abstract: "An experimental study of charge distributions in electron–beam irradated polypropylene films." IEEE Transactions on Electrical Insulation, v. 26, n. 2, Apr. 1991, p. 228–235.

Simco® Instruction, OPeration, and Maintenance Manual on Chargemaster® Pinner™ Arc Resistant Charging Bar.

K.D. Lawrence, R.T. Lucas, and J.A. Young, "An Improved Device for the Formation of Superfine, Thermoplastic Fibers" U.S. Naval Research Laboratory, Feb. 11, 1959. NRL Report 5265.

V.A. Wente, E.L. Boone, and C.D. Fluharty, "Manufacture of Superfine Organic Fibers" U.S. Naval Research Laboratory, May 25, 1954. NRL Report 4364.

* cited by examiner

ELECTRET TREATMENT OF HIGH LOFT AND LOW DENSITY NONWOVEN WEBS

This application claims the benefit of U.S. Provisional Application No. 60/090,716 filed on Jun. 26, 1998 entitled "Improved Electret Treatment of High Loft and Low Density Nonwoven Webs, the entirety of which is hereby incorporated by reference.

FIELD OF THE INVENTION

The present invention relates generally to electret treated filtration materials and processes for electret treating such materials.

BACKGROUND

It is frequently desirable to provide a filtration material with enhanced filtration efficiency. Such filtration materials may be utilized in a wide variety of areas, such as, for example, HVAC filter applications, medical applications, and protective garments. Materials such as, for example, nonwoven webs and porous films may be subjected to electret treatment to enhance the filtration efficiencies of these materials.

In some electreting processes, an electric field is established between a corona producing apparatus such as a charge bar or ionizer (the anode) and the bias roll (the cathode). A web or film of dielectric material is passed through the electric field and a charge is established on the web or film.

The electret treatment conditions such as, for example, current, field strength, air temperature and relative humidity, and the resistance between the charge bar (or ionizer) and bias roll, are selected so that the electrical discharge is just below the arcing point or ignition voltage. The arcing point is defined as the point where current increases with no associated increase in applied voltage.

The resistance between the charge bar and the bias roll is dependent on a variety of factors, including upon the distance between the charge bar and the bias roll (air gap), the temperature and relative humidity of the air within the air gap, and the characteristics of the web disposed between the charge bar and bias roll. In particular, variations in the basis weight and formation consistency of the web may cause selected areas of the web or film to have a lower resistance than other portions of the web. Thus, as the web or film is moved between the charge bar and bias roll, the resistance presented by the web or film varies. When the resistance presented by the combination of the web or film and the air gap declines sufficiently during the electret treatment process, a conductive pathway may form and arcing may occur between the charge bar and the bias roll.

Additionally, the relative humidity and temperature at which the electret treatment is applied should be controlled in many applications, as increasing amounts of water vapor increases the average dielectric constant of the gas in the gap. As the dielectric constant of the gas changes, the slope of the current-voltage curve is altered because the resistance of the gap changes. Altering the resistance of the gap changes the conditions at which arcing will occur. Also, the presence of gas phase water in the gap decreases the free electron population, thereby reducing the ability to form an electret.

To enhance the filtration efficiency of a web, the electret treatment must be uniformly applied to the web and the electret treatment process should form no undesired apertures in the web.

When charge bars which are configured as series devices are used in the electret treatment process, the portion of the web or film passing through the charge bars during an arcing event is not electret treated, resulting in a non-uniformly electret treated web. In such a device, all the current applied to the charge bar flows through the arc, thereby preventing a charge from being formed on other portions of the web or film moving past the charge bar during the arcing event. An example of an ionizer configured as a series device is disclosed in U.S. Pat. No. 5,627,376 to Jaisinghani et al., the entirety of which is hereby incorporated by reference. As an inconsistent application of an electrical charge to the web or film is undesirable in many applications, the use of ionizers or charge bars which are configured as series devices presents a particular problem for webs which have a non-uniform density, such as high loft webs.

If arcing occurs, an undesirable aperture may be formed in the web or film, preventing the application of a uniform electric charge to portions of the web or film moving between the charge bar and bias roll. Various nonwoven webs, such as those described below, are particularly well suited for use as filtration materials.

SUMMARY

The present invention is directed to a process of forming an electret nonwoven web, the process including the step of providing a nonwoven web. The nonwoven web provided may, in selected embodiments of the step of providing a nonwoven web, include the step of providing a high loft nonwoven web. Such a high loft nonwoven web may have an Ames Bulk of greater than about 0.10 inches (3 mm). The high loft nonwoven web may have a thickness greater than about 0.15 inches (about 4 mm). The high loft nonwoven web may also have a bulk density which is less than about 0.1 grams per cubic centimeter.

The present invention may further include the step of generating a DC corona discharge from an apparatus which includes an anode electrically configured as a parallel device. In such a device, the anode may be configured as a charge bar. In some embodiments of the process of the present invention, the anode may include a plurality of sets of pins, each pin within a set being spaced apart from the next nearest pin by at least 0.125 inches (0.3175 cm), each set of pins being spaced apart from the next nearest pin by at least 0.125 inches (0.3175 cm). In other embodiments, the pins may be spaced apart by 0.25 inches (0.635 cm). Each set of pins may include at least four pins. The pins within each set of pins may be electrically connected in series to a resistor extending from a power bus, each set of pins and the associated resistor being electrically connected in parallel to the power bus.

The process of the present invention may further include the step of subjecting the web to DC corona discharge to form an electret.

In certain embodiments of the process, the ambient atmosphere may be controlled so that the process is conducted in an environment having a relative humidity between about 60% at 60 degrees F. and about 50% at 90 degrees F. Other embodiments of the process may include controlling the ambient atmosphere so that a relative humidity between about 40% at 60 degrees F. to about 30% at 90 degrees F. is desirable. In particular processes, a range of about 30% at 60 degrees F. to about 20% at 90 degrees F. may be desirable.

DEFINITIONS

Figure 1:
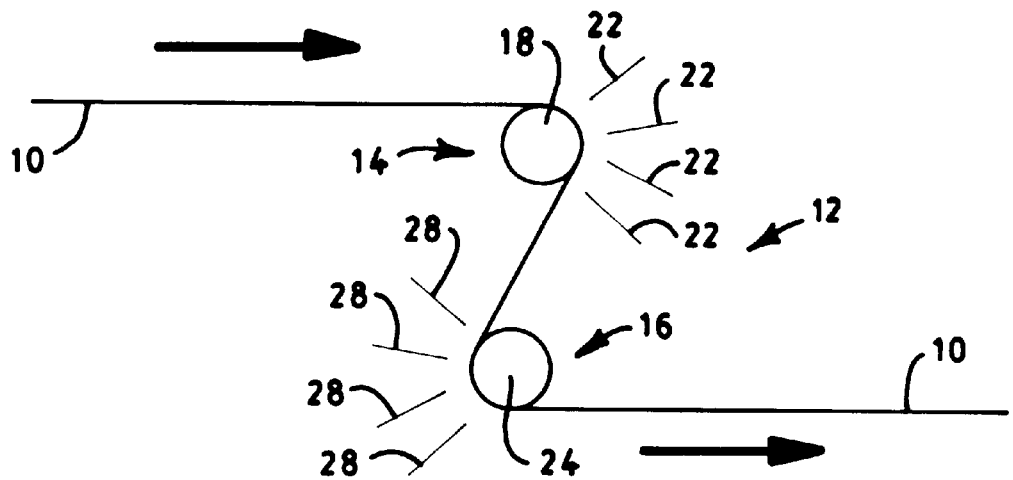
FIG. 1 is a schematic diagram of an embodiment of an electret treatment station in an embodiment of the present invention.

As used herein, "dielectric material" refers to any material, such as a polymer, which is an electrical insulator or in which an electric field can be sustained with a minimum dissipation of power. A solid material is a dielectric if its valence band is full and is separated from the conduction band by at least 3 eV. This definition is adopted from the *McGraw-Hill Encyclopedia of Science and Technology,* 7th Edition, copyright, 1992.

As used herein, the term "electret" is any dielectric material which exhibits an external electric field in the absence of an applied field. This definition is adopted from *Electrets: Topics in Applied Physics,* Vol. 33, 2nd Edition, G. M. Sessler, Ed., Springer-Verlag, New York, 1987.

As used herein, the terms "electret treatment" and "electreting" refer to any process which forms an electret. One exemplary process for placing a charge on a dielectric material involves the application of DC corona discharge to the material. An exemplary conventional method of this type is described in detail in U.S. Pat. No. 5,401,446 to Tsai et al. entitled "Method and Apparatus for the Electrostatic Charging of a Web or Film" which issued on Mar. 28, 1995, the entirety of which is hereby incorporated by reference. Corona producing apparatus that can be used in electret treatment processes are commonly referred to as "ionizers" or "chargers. Additionally, the anode portion of the corona treatment apparatus, whether referred to herein as an ionizer or a charge bar, may be electrically configured as a series device or a parallel device.

As used herein, the term "nonwoven" fabric or web refers to a web having a structure of individual fibers or filaments which are interlaid, but not in an identifiable repeating manner as in a knitted fabric. Nonwoven fabrics or webs can be formed by a variety of processes known to those skilled in the art such as, for example, meltblowing, spunbonding and bonded carded web processes.

As used herein, the term "spunbonded web" refers to a web of small diameter fibers which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. Methods of making suitable spunbonded fiber webs include, but are not limited to, the following U.S. patents: Pike et al., U.S. Pat. No. 5,382,400; Appel, et al., U.S. Pat. No. 4,340, 563; Matsuki et al., U.S. Pat. No. 3,802,817; Dorschner et al., U.S. Pat. No. 3,692,618; Kinney, U.S. Pat. Nos. 3,338, 992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; and Harmon, Canadian Patent No. 803,714, which are hereby incorporated by reference. Spunbonded fiber webs which are particularly well suited for use as filtration media are described in the following: Midkiff et al., U.S. Pat. No. 5,709,735; Pike et al., U.S. Pat. No. 5,597,645; PCT Application No. US94/12699 (Publication No. VVO95/13856); PCT Application No. US95/13090 (Publication No. VVO96/13319); and PCT Application No. US96/19852 (Publication No. WO97/23246). The contents of these aforementioned references is hereby incorporated by reference.

Meltblown fibers are generally formed by extruding a molten thermoplastic material through a plurality of fine, usually circular, die capillaries as molten filaments into a high-velocity, usually hot, gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly disbursed meltblown fibers. The meltblown process is well known and is described in various patents and publications, including NRL Report 4364, "Manufacture Of Super-Fine Organic Fibers" by V. A. Wendt, E. L. Boone, and C. D. Fluharty; NRL Report 5265, "An Improved Device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al., which are hereby incorporated by reference. The meltblown fiber webs having small average fiber diameter and pore size, such as those described in U.S. Pat. No. 5,721,883 to Timmons et al., the entirety of which is hereby incorporated by reference, are particularly well suited for use with the present invention.

As used herein, the term "microfibers" means small diameter fibers having an average diameter not greater than about 100 microns, for example, having a diameter of from about 0.5 microns to about 50 microns, or more particularly, microfibers may have an average diameter of from about 4 microns to about 40 microns. Average fiber diameter may be calculated by taking at least ten random measurements of fiber diameters and averaging those measurements.

Staple fiber webs, such as air-laid or bonded/carded webs are also suitable for formation of filtration media. An exemplary staple fiber web is described in U.S. Pat. No. 4,315,881 to Nakajima et al., the entirety of which is incorporated herein by reference.

As used herein, "multilayer nonwoven laminate" means a laminate of two or more nonwoven layers such as, for example, a laminate having at least one spunbonded layer which is bonded to at least one meltblown layer, such as a spunbonded/meltblown/spunbonded laminate. Such a laminate may be made by sequentially depositing onto a moving forming belt a first spunbonded fabric layer, then a meltblown fabric layer and then another spunbonded fabric layer. The layers of the laminate are then bonded such as by thermal point bonding. Alternatively, the fabric layers may be made individually, collected in rolls, and combined in a separate bonding step. Examples of multilayer nonwoven laminates are disclosed in the following patents: U.S. Pat. No. 5,721,180 to Pike et al.; U.S. Pat. No. 4,041,203 to Brock et al.; U.S. Pat. No. 5,188,885 to Timmons et al.; and U.S. Pat. No. 5,482,766 to Bradley et al.; the entirety of these aforementioned references being hereby incorporated by reference.

Frazier Porosity is a standard measure in the non-woven web art of the rate of airflow per square foot through the material and is thus a measure of the permeability of the material (units are cubic feet per square foot per minute). For all samples the procedure used to determine Frazier air permeability was conducted in accordance with the specifications of method 5450, Federal Test Methods Standard No. 191 A, except that the specimen sizes were 8 inches by 8 inches rather than 7 inches by 7 inches. The larger size made it possible to ensure that all sides of the specimen extended well beyond the retaining ring and facilitated clamping of the specimen securely and evenly across the orifice.

As used herein, the Ames Bulk is the thickness of the material measured over a fixed area at a fixed applied load. As used herein, Ames Bulk is determined at an applied load of 182 grams±5 grams (0.4 lb.±0.01 LB) over a fixed area of twenty five square inches (five inches along the horizontal dimension by five inches along the vertical direction).

The loftiness of a web is measured as the Ames Bulk. As used herein, "high loft" nonwoven webs are webs which have a thickness, measured as Ames Bulk, of greater than about 0.10 inches, (about 3 mm), and preferably a thickness greater than about 0.15 inches (about 4 mm). As used herein, "low loft" materials will typically have a thickness, also measured as Ames Bulk, of less than about 0.10 inches, and preferably a thickness less than about 0.05 inches (about 2 mm). The bulk density is calculated by dividing the basis weight of the web by the Ames Bulk. The bulk density of high loft webs is typically less than about 0.1 grams per cubic centimeter ($g/cm^3$), and the bulk density of such low loft webs is typically greater than 0.1 $g/cm^3$.

Air filtration efficiencies of nonwoven webs may be evaluated using a TSI, Inc. (St. Paul, Minn.) Model 8110 Automated Filter Tester (AFT). The Model 8110 AFT measures pressure drop and particle filtration characteristics for air filtration media. The AFT utilizes a compressed air nebulizer to generate a submicron aerosol of sodium chloride particles which serves as the challenge aerosol for measuring filter performance. The characteristic size of the particles used in such measurements is 0.1 micrometer. Typical air flow rates are between 31 liters per minute and 33 liters per minute through a sample area of filter medium of about 140 $cm^2$. The performance or efficiency of a filter medium is expressed as the percentage of sodium chloride particles which penetrate the filter. Penetration is defined as transmission of a particle through the filter medium. The transmitted particles are detected downstream from the filter. The percent penetration or filter penetration (% P) reflects the ratio of the downstream particle count to the upstream particle count. Light scattering may be used for the detection and counting of the sodium chloride particles. The percent efficiency or filtration efficiency (E) may be calculated from the percent penetration (or filter penetration) by the following formula: E=100−%P.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, any given range is intended to include any and all lesser included ranges. For example, a range of from 45–90 would also include 50–90; 45–80; 46–89 and the like.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates or materials added to enhance processability of a composition.

DETAILED DESCRIPTION

Reference will now be made in detail to various embodiments of the apparatus utilized with present invention, one or more examples of which are illustrated in the drawings. Each example is provided by way of explanation of the invention, and not meant as a limitation of the invention. For example, features illustrated or described as part of one embodiment can be used in another embodiment to yield still a further embodiment. It is intended that the present invention cover such modifications and variations coming within the scope and spirit of the invention.

Although a wide variety of webs may be used in the present invention, such as, for example, spundbonded webs, meltblown webs, films, staple fiber webs, or multilayer nonwoven laminates of such webs, side-by-side bicomponent spunbonded webs were utilized in the examples presented herein.

Other webs which are suitable for use in the present invention include meltblown fiber webs having a basis weight between about 0.3 ounces per square yard (osy) and about 4 osy, and even more desirably between about 0.3 osy and about 1 osy. With respect to meltblown fiber webs, and as a specific example, both the polypropylene and the polyethylene desirably have a number average molecular weight (or Mn) of between about 20,000 and 40,000 and a melt-flow rate of at least 400 grams of polymer at 230 degrees C. in ten minutes, measured per ASTM D1238, and even more desirably between about 800 and 1000 grams of polymer at 230 degrees C. in ten minutes, measured per ASTM D1238.

Spunbonded fiber webs suitable for use with the present invention desirably have a basis weight between about 1 ounces per square yard (osy) (or about 34 grams per square meter or gsm) and about 10 osy (about 340 gsm). With respect to bicomponent spunbonded fiber webs, and as a specific example, both the polypropylene and the polyethylene desirably have a Mn of between about 100,000 and 200,000 and a melt-flow rate between about 20 and 36 grams of polymer at 230 degrees C. in ten minutes measured per ASTM D1238.

According to the present invention, a nonwoven web 10 is electret treated with an electret treatment unit 12 shown in FIG. 1, the electret treatment unit 12 having a first electret treatment station 14 and a second electret treatment station 16. The first and second electret treatment stations are positioned in series. The nonwoven web 10 moves through the treatment stations 14 and 16 in the direction indicated by the arrows.

The first and second treatment stations 14 and 16 each include a bias roll 18 and 24, respectively. The bias roll serves both as an electrode and a mechanism for transfer of the web 10 into and out of the electret treatment unit 12.

Figure 2:
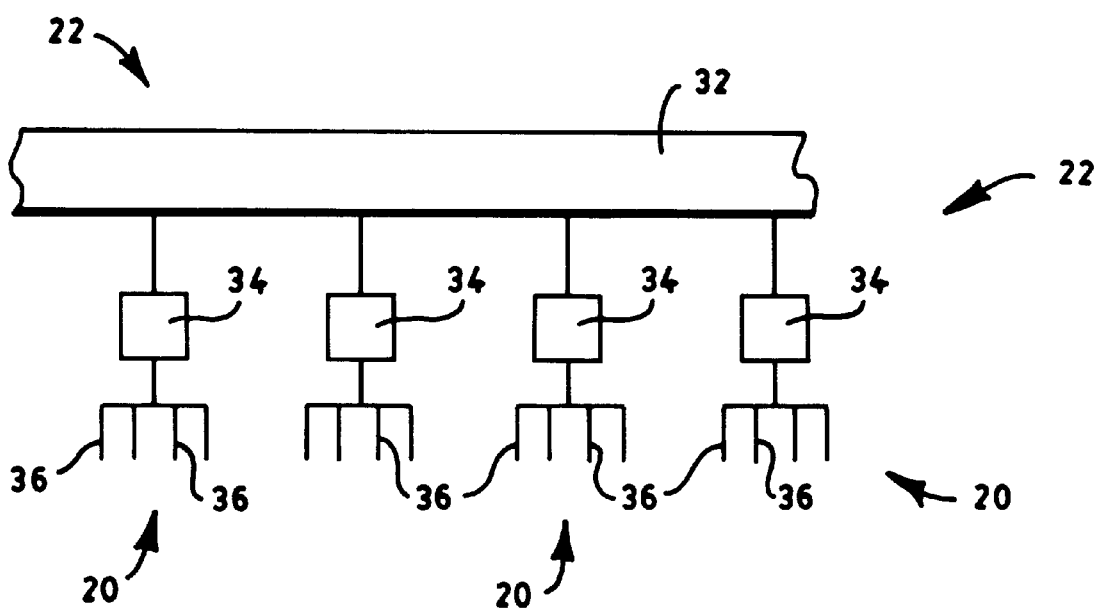
FIG. 2 is a schematic diagram of a charge bar configured as a parallel device which is utilized in the present invention.

Each treatment station, an embodiment of which is schematically depicted in FIG. 1, also includes an anode. In the embodiment depicted in FIG. 1, the anode is a charge bar which is electrically configured as a parallel device, an embodiment of the parallel device charge bar being depicted in FIG. 2 at 22. Although a variety of charge bars 22 which are electrically configured as a parallel device may be utilized in the present invention, the charge bar 22 may include a plurality of sets 20 of four pins 36, extending from a resistor 34. The pins 36 in each set 20 are generally spatially aligned in a parallel fashion with respect to each other. A wide variety of pin spacings may be utilized in the present invention, and, in some devices, the pins may be spaced apart from each other by at least 0.125 inches (0.3175 cm). In other devices, may be spaced apart from each other by 0.25 inches (0.635 cm). The pins within each particular set 20 are electrically connected in series to the resistor 34. Each resistor 34 extends from a power bus 32. Each set of pins 20 and the associated resistor 34 is electrically connected in parallel to the power bus 32.

Such charge bars are frequently utilized to adhere, or "pin" films together by applying an electrostatic charge to a first film which will cause the first film to be attracted to and adhere to a second film. A parallel device charge bar suitable for use in the present invention is a Chargemaster® Pinner™ Arc Resistant charge bar which is available from SIMCO of Hatfield, Pa.

In the embodiment depicted in FIG. 1, four charge bars are utilized in each treatment station although any number of charge bars may also be utilized.

Figure 3:
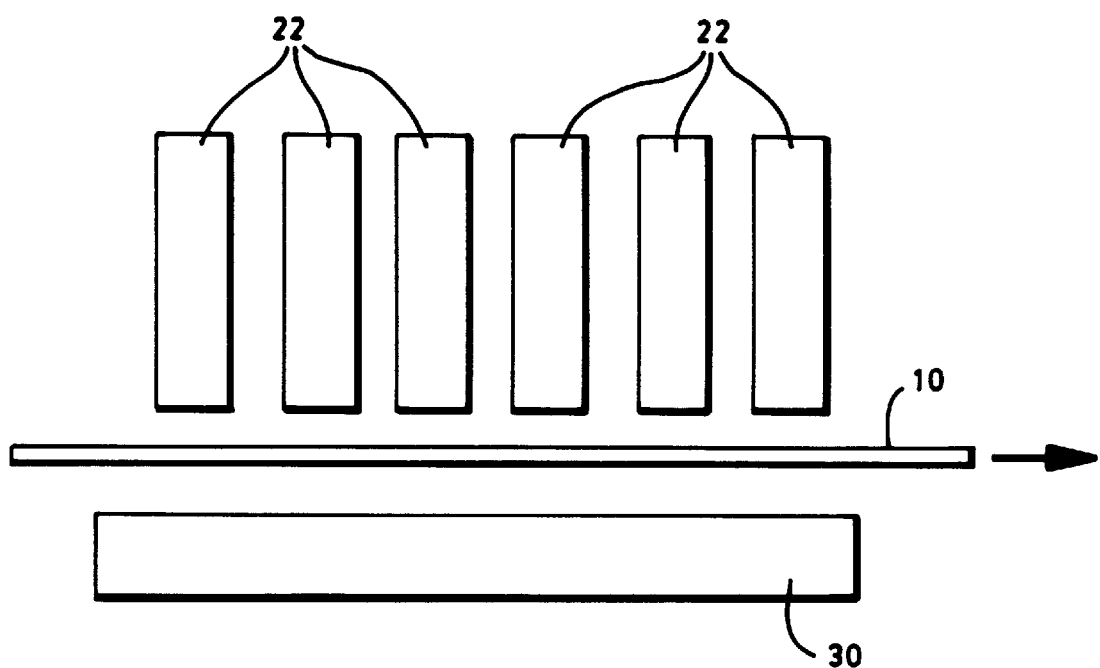
FIG. 3 is a schematic diagram of an alternate embodiment of the electret treatment station in a process of the present invention.
Figure 4:
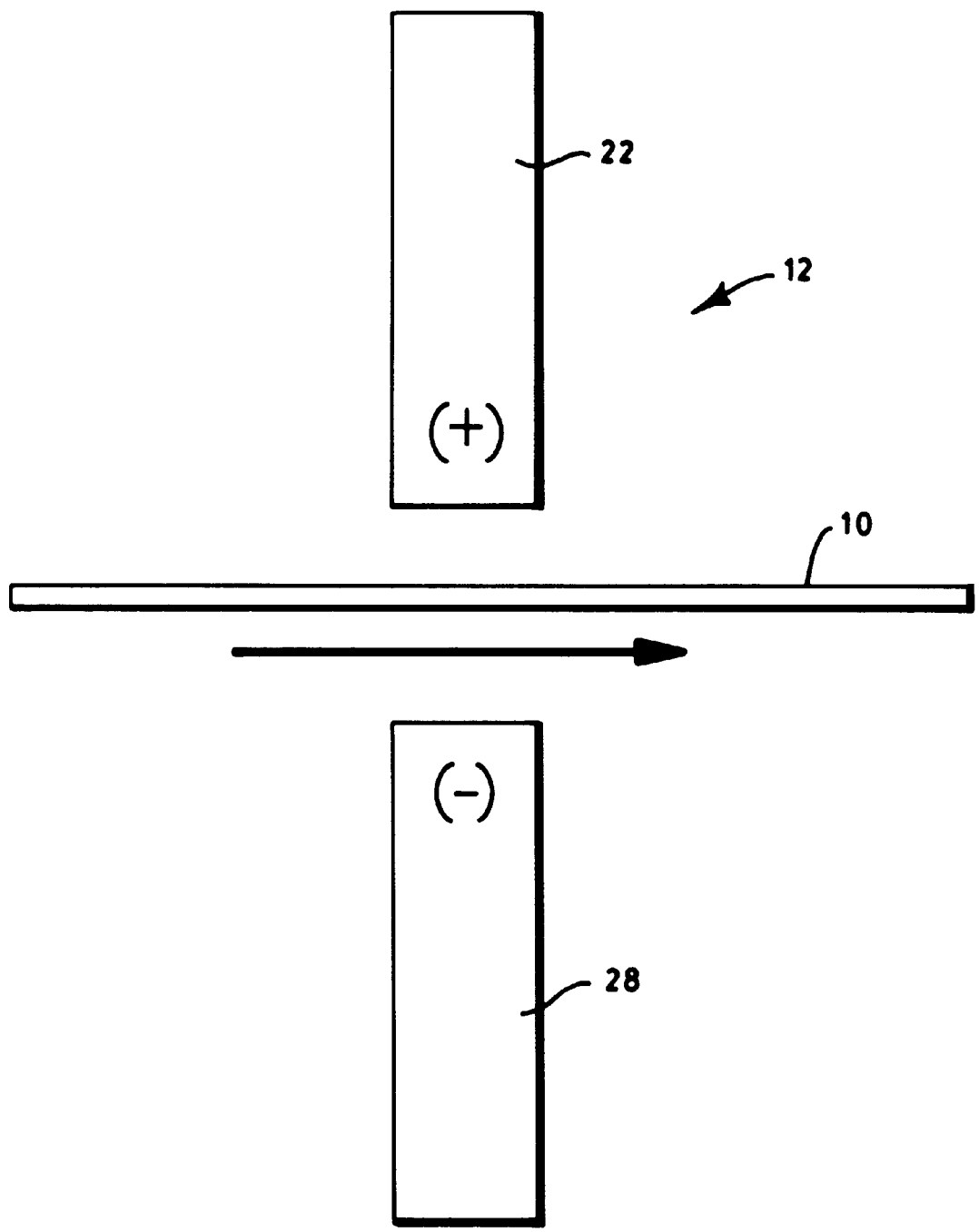
FIG. 4 is a schematic diagram of another alternate embodiment of the electret treatment segment of a process of the present invention.

As shown in FIG. 1, the pins 36 of the parallel device charge bar 22 are positioned proximate to and spaced equidistant from the nonwoven web 10, and are separated from the web 10 by a gap. In selected embodiments, the gap between the nonwoven web 10 and the pins 36 of each parallel device charge bar 22 is roughly uniform for each parallel device charge bar 22. This may be accomplished in several ways, including positioning the charge bars radially outwardly from the bias roll, as depicted in FIG. 1. Alternately, as depicted in FIG. 3, at least one parallel device charge bar 22 is disposed on one side of the nonwoven web 10 while a bias plate 30 is disposed on the other side of the nonwoven web 10. Alternate embodiments of the present invention include a wide variety of configurations of the charge bars 22 and a biasing device such as the bias plate and bias roll described above. An additional alternate configuration of treatment station is depicted in FIG. 4, wherein two charge bars 22 and 28 are positioned on opposite sides of the nonwoven web 10.

High loft and low loft bicomponent spunbonded nonwoven webs described above were subjected to electret treatment on-line by the above-described apparatus. In selected embodiments, the electret treatment may be performed as part of other on-line operations such as, for example, converting of the web into particular products, or may be performed off-line.

In some of the examples which follow, a wire ionizer or (series device ionizer) was utilized in place of the parallel device charge bar for the purposes of comparison. The series device wire ionizer is configured differently than the parallel device charge bar and is essentially a thin wire positioned within a channel frame and maintained under tension. Like the parallel device charge bar, the series device wire ionizer is positioned within the electret treatment station so as to span the width of the web or film passing through the electret treatment station. Such a wire ionizer is described in U.S. Pat. No. 5,627,376 to Jaisinghani et al., which is hereby incorporated by reference.

For each ionizing device, specifically the parallel device charge bars and the series device wire ionizers, the polarity of the ionizing device was maintained positive and the polarity of the bias rolls was maintained negative relative to earth ground, although alternate configurations of polarity may be utilized.

Figure 5:
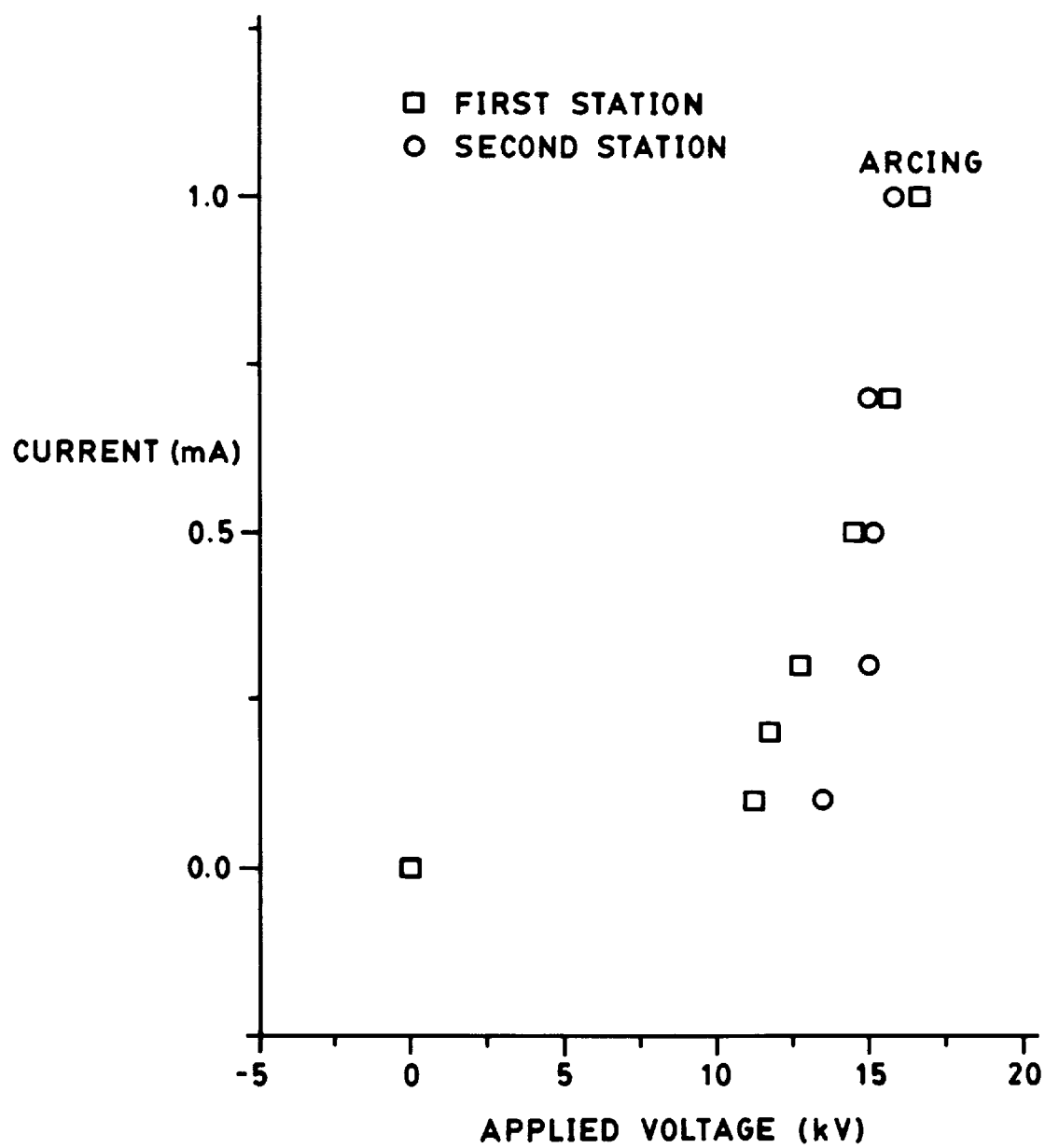
FIG. 5 is a graph illustrating the ionizing current as a function of applied voltage during electret treatment of a 2.0 ounces per square yard (osy) high loft side-by-side bicomponent spunbonded web using wire ionizers which are electrically configured as series-type devices.

FIG. 5 depicts the ionizing current as a function of applied voltage during the electret treatment of a 2.0 osy high loft side-by-side bicomponent spunbonded web using the wire ionizer as described above. Notably, the ionizing current rises very rapidly just above 10 kV. The rise in current continues until the arcing point, indicated by the word "Arcing" on the graph, is reached at about 15 kV. The maximum current which could be achieved before arcing was approximately 1 mA.

Figure 6:
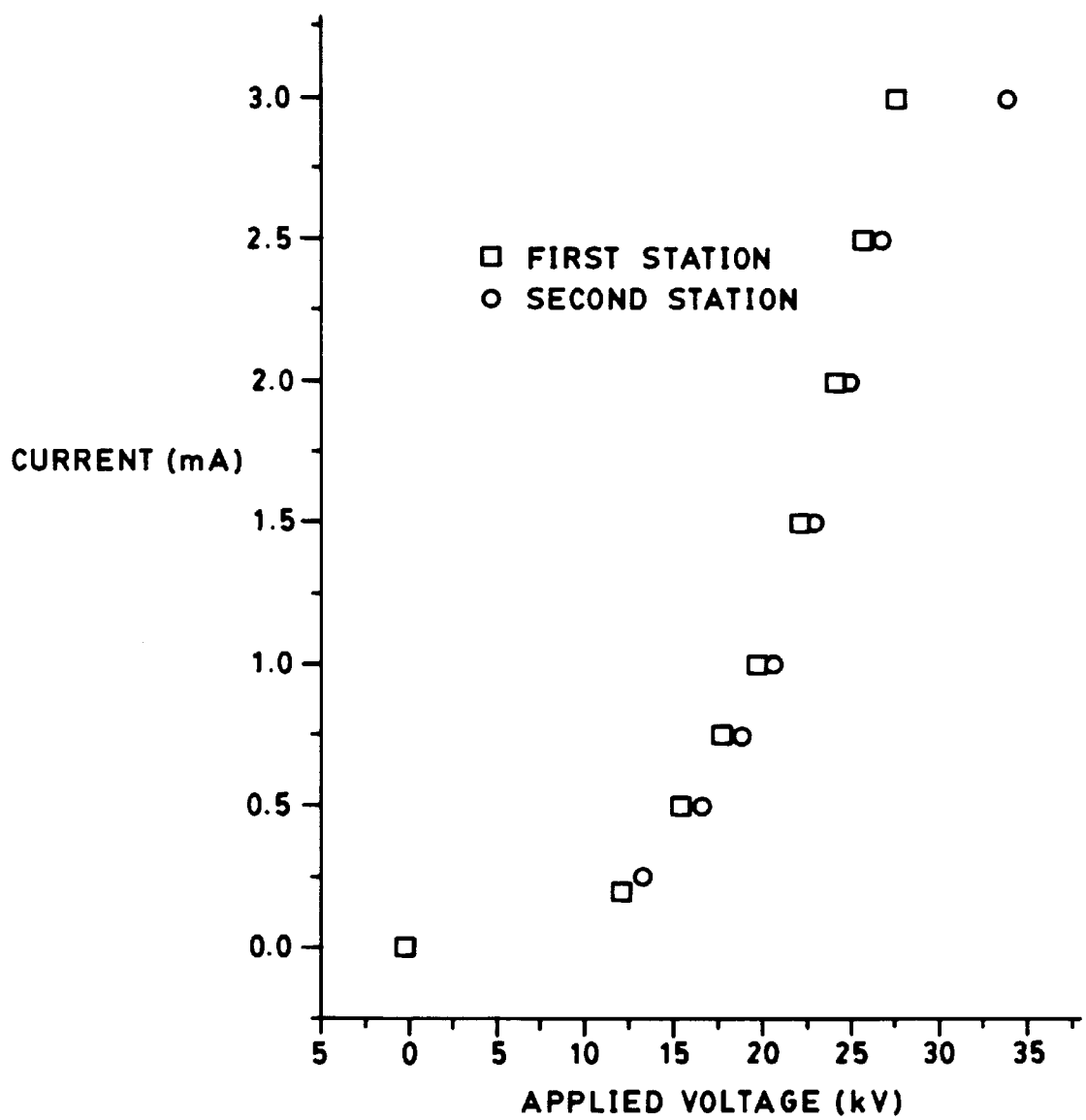
FIG. 6 is a graph illustrating the ionizing current as a function of applied voltage during electret treatment of a 2.0 ounces per square yard (osy) high loft side-by-side bicomponent spunbonded web using charge bars which are electrically configured as parallel devices.

In contrast to the current-voltage characteristic (I-V) for series device wire ionizers depicted in FIG. 5, the ionizing current measured for the parallel device charge bar, depicted in FIG. 6, increases monotonically over the entire range of the applied voltage. In addition, the applied voltage can be increased significantly over the voltage used with series device wire ionizers without arcing. For example, the maximum voltage shown in FIG. 6 is about 25 kV. However, in contrast to the wire ionizers, no arcing was detected at this higher field in processes utilizing charge bars. The maximum ionizing current achieved in processes utilizing charge bars was 3 mA, roughly three-times higher than the maximum ionizing current achieved with wire ionizers. The maximum ionizing current of 3 mA was limited by the power supply utilized. Higher ionizing currents may be achieved with different power supplies.

Additionally, it is important to control the relative humidity and air temperature as variables in the electret treatment process. As used herein, the term relative humidity is defined as the ratio of the partial pressure of water in air to its saturation vapor pressure at a given temperature. Thus, a relative humidity of 20% at 65 degrees F. is different than a relative humidity of 20% at 80 degrees F. In many processes, a relative humidity of about 60% at 60 degrees F. to about 50% at 90 degrees F. is suitable for electret treating a variety of materials by the apparatus described herein. In some processes, a range of about 40% at 60 degrees F. to about 30% at 90 degrees F. is desirable. In selected processes, a range of about 30% at 60 degrees F. to about 20% at 90 degrees F. is desirable.

EXAMPLE 1

Samples of a high loft bicomponent spunbonded webs were electret treated with either series device wire ionizers or parallel device charge bars. The side-by-side bicomponent spunbonded webs utilized in the examples presented herein were prepared in a manner similar to that described in U.S. Pat. No. 5,382,400 to Pike et al., the entirety of which is hereby incorporated by reference. The A-side polymer was Exxon 3155 (Exxon Chemical Company, Houston, Tex.) polypropylene and the B-side polymer was Dow XUS 61800.41 (Dow, Midland, Mich.) polyethylene. The bicomponent spunbonded webs utilized were prepared using a 14 inch (about 36 cm) wide pilot scale spunbonded machine. The line speed of the forming wire was used to control the basis weight of the nonwoven web. Basis weights of 2.0 ounces per square yard (osy) (about 68 grams per square meter or gsm), 2.5 osy, and 3.0 osy were spun using polypropylene/polyethylene side-by-side bicomponent fibers. The air filtration efficiencies of these webs were measured using the AFT tester, as described above. For each sample, ten measurements were taken of Frazier porosity, pressure drop and percent penetration. The average of these measurement are reported in Table 1 and Table 2.

TABLE 1

Filter Penetration for High Loft Bicomponent
Spunbonded Webs Electret Treated Using
Series Device Wire Ionizers

| Basis Weight (osy) | Frazier Porosity (cfm) | Pressure Drop (mm H₂O) | Filter Penetration (%) |
|---|---|---|---|
| 2.0 | 600 + 15 | 0.13 + 0.05 | 45.9 + 1.6 |
| 2.5 | 435 + 33 | 0.17 + 0.05 | 39.9 + 1.7 |
| 3.0 | 478 + 53 | 0.20 + 0.0 | 35.8 + 2.1 |

TABLE 2

Filter Penetration for High Loft Bicomponent
Spunbonded Webs Electret Treated Using
Parallel Device Charge Bar Ionizers

| Basis Weight (osy) | Frazier Porosity (cfm) | Pressure Drop (mm H₂O) | Filter Penetration (%) |
|---|---|---|---|
| 2.0 | 606 + 14 | 0.13 + 0.07 | 38.1 + 2.6 |
| 2.5 | 518 + 34 | 0.15 + 0.05 | 30.4 + 1.4 |
| 3.0 | 450 + 2 | 0.18 + 0.04 | 28.0 + 1.4 |

Notably, the high loft bicomponent spunbonded webs which were electret treated using parallel device charge bars exhibited significantly lower percent penetrations (i.e. higher filtration efficiencies) than similar webs treated using series device wire ionizers. It is believed that this improvement results from the operation of the parallel device charge bars at higher voltage and higher ionization current as compared to the series device wire ionizers.

EXAMPLE 2

The basis weight, Frazier porosity, and Ames bulk of the polypropylene/polyethylene bicomponent spunbonded webs utilized in this example are listed below in Table 3. The high and low loft webs listed therein were either electret treated on-line using wire ionizers, or were electret treated off-line using charge bars. Whether treated on-line or off-line, each web was passed through two treatment stations and was subjected to the electric field established between the ionizer and the bias roll. For both types of ionizers, the polarity of the ionizing device was maintained positive and the polarity of the bias rolls was maintained negative relative to earth ground. In alternate embodiments, a variety of configurations of polarity may be used in the present invention.

For electret treating the high loft web samples with the wire ionizers, the first treatment station was operated at a potential of 13 kV between the ionizer and bias roll, and the ionizer current was 0.1 mA, while the second treatment station was operated at a potential of 22.3 kV between the ionizer and the bias roll, and the ionizer current of the second treatment station was 5.5 mA. The webs were electret treated in an environment of 40% relative humidity at 70 degrees F.

For electret treating the low loft web samples with the wire ionizers, the first treatment station was operated at 6.6 kV and an ionizing current of 2.0 mA. The second treatment station was operated 8 kV and an ionizing current of 14.0 mA. The on-line treatment stations were sixty (60) inches (about 152.4 cm) wide in order to cover the deckle width of the spunbonded machine.

Samples of high loft and low loft bicomponent spunbonded webs were also produced without on-line electret treatment and were electret treated off-line with charge bars according to the schematic diagram shown in FIG. 1 and described above. These materials were electret treated off-line using charge bars at a line speed of 50 ft/min. Both high loft and low loft webs were processed at the following conditions: the first treatment station was operated at 20 kV and an ionizing current of 3.0 mA; the second treatment station was operated at 21.5 kV and an ionizing current of 3.0 mA. The off-line treating was performed using four 20 inch (about 55 cm) wide Pinner® Bar ionizers in each station.

TABLE 3

Physical Characteristics of the Bicomponent Spunbonded Webs

| Sample | Basis Weight (osy) | Ames Bulk (in.) | Web Density (g/cm³) |
|---|---|---|---|
| High Loft | 3.0 | 0.150 | 0.0267 |
| Low Loft | 4.0 | 0.050 | 0.1069 |

Additionally, the filtration efficiencies of the high and low loft bicomponent spunbonded webs similar to the webs used in Example 2 were measured without subjecting the webs to electret treatment. These filtration efficiencies, determined utilizing the Automated Filter Tester in the manner described above, are reported in Table 4.

TABLE 4

Filter Penetration for Non-Electret Treated
High Loft and Low Loft Bicomponent Spunbonded Webs

| Sample | Pressure Drop (mm H₂O) | Filter Penetration |
|---|---|---|
| High Loft | 0,25 + 0.06 | 95.6 + 1.7 |
| Low Loft | 1.3 + 0.04 | 70.1 + 3.2 |

The air filtration efficiencies of high and low loft webs manufactured as described above which were electret treated with series device wire ionizers and charge bars are tabulated in Table 5.

TABLE 5

Filter Penetration for Electret Treated High Loft and Low Loft
Bicomponent Spunbonded Webs

| | High Loft | Low Loft |
|---|---|---|
| Series Device Wire Ionizers | | |
| Pressure Drop (mm H₂O) | 0.23 + 0.03 | 1.15 + 0.05 |
| Filter Penetration | 31.4 + 3.8 | 13.3 + 0.2 |
| Parallel Device Charge Bars | | |
| Pressure Drop (mm H₂O) | 0.29 + 0.03 | 1.15 + 0.05 |
| Filter Penetration (%) | 18.98 + 1.3 | 11.1 + 0.6 |

The data shows that the filter penetration of high loft webs electret treated with charge bars is significantly lower than the filter penetration of high loft webs electret treated with wire ionizers, The low loft web exhibits a more modest improvement. Both the high and low loft webs which were electret treated with the charge bar; were subjected to higher electric field strengths than the webs which were electret treated with the wire ionizers, without electrical arcing occurring between the charge bars and the bias rolls.

EXAMPLE 3

The thermal stability of the electret treated high loft polypropylene/polyethylene bicomponent spunbonded webs was evaluated using the webs described in Example 2. Samples of material were thermally annealed for 185 hours at 130 degrees Fahrenheit in a conventional forced air laboratory convection oven, which is available from Fisher Scientific. The oven temperature was controlled to within +2 degrees Fahrenheit. Thermal stability was examined by comparing the filtration efficiency, as measured by the AFT test, before and after the thermal annealing described above. The filtration data is summarized in Table 6, wherein the Initial Efficiency, as reported in percent, is the filtration efficiency before thermal annealing. The Final Efficiency, reported in percent, is the filtration efficiency after thermal annealing. The Percent Change in filtration efficiency was calculated as follows: Percent Change=(Initial Filtration Efficiency−Final Filtration Efficiency)/Initial Filtration Efficiency.

TABLE 6

Filtration Efficiency for Thermally Annealed High Loft Bicomponent Spunbonded Webs Electret Treated Using Series Device Wire Ionizers

| Basis Weight | 2.0 | 2.5 | 3.0 |
|---|---|---|---|
| Initial Efficiency | 54 | 60 | 64 |
| Final Efficiency | 48 | 51 | 52 |
| Percent Change | 11 | 14 | 19 |

TABLE 7

Filtration Efficiency for Thermally Annealed High Loft Bicomponent Spunbonded Webs Electret Treated Using Parallel Device Charge Bars

| Basis Weight | 2.0 | 2.5 | 3.0 |
|---|---|---|---|
| Initial Efficiency | 62 | 70 | 72 |
| Final Efficiency | 56 | 64 | 69 |
| Percent Change | 10 | 8 | 5 |

The change in efficiency on thermal annealing is less for the higher basis weight bicomponent spunbonded materials. It is believed that this reduction in percent change of filtration efficiency is an improvement which is due to the more effective electret treatment at higher field strengths.

While the invention has been described in detail with respect to specific embodiments thereof, it will be appreciated that those skilled in the art, upon attaining an understanding of the foregoing, may readily conceive of alterations to and variations of the embodiments disclosed herein. Such alterations and variations are believed to fall within the scope and spirit of the present invention and the appended claims.

What is claimed is:

1. A process of forming an electret nonwoven web, the process comprising the steps of:
   providing a nonwoven web;
   generating a DC corona discharge from an apparatus including an anode electrically configured as a parallel device, the anode including a plurality of sets of pins, each pin within a set being spaced apart from the next nearest pin by at least 0.125 inches (0.3175 cm), each set of pins being spaced apart from the next nearest pin by at least 0.125 inches (0.3175 cm); and
   subjecting the web to DC corona discharge to form an electret.

2. The process of claim 1, the anode being configured as a charge bar.

3. The process of claim 1, each set of pins including at least four pins.

4. The process of claim 1, the pins within each set of pins being electrically connected in series to a resistor.

5. The process of claim 1, each resistor extending from a power bus, each set of pins and the associated resistor being electrically connected in parallel to the power bus.

6. The process of claim 1 further including the step of providing an ambient atmosphere having a relative humidity between about 60% at 60 degrees F. and about 50% at 90 degrees F.

7. The process of claim 1, further including the step of providing an ambient atmosphere having a relative humidity between about 40% at 60 degrees F. and about 30% at 90 degrees F.

8. The process of claim 1, further including the step of providing an ambient atmosphere having a relative humidity between about 30% at 60 degrees F. and about 20% at 90 degrees F.

9. The process of claim 1, step of providing a nonwoven including the step of providing a high loft nonwoven web.

10. A process of forming an electret nonwoven web, the process comprising the steps of:
    providing a nonwoven web;
    generating a DC corona discharge from an apparatus including an anode electrically configured as a parallel device; and
    subjecting the web to DC corona discharge to form an electret;
    wherein the step of providing a nonwoven web includes the step of providing a high loft nonwoven web having an Ames Bulk of greater than about 0.10 inches (3 mm).

11. The process of claim 9, the step of providing a high loft nonwoven web including the step of providing a high loft nonwoven web having a thickness greater than about 0.15 inches (about 4 mm).

12. The process of claim 9, the step of providing a high loft nonwoven web including the step of providing a high loft nonwoven web having a bulk density which is less than about 0.1 grams per cubic centimeter.

13. A process of forming an electret nonwoven web, the process comprising the steps of:
    providing a nonwoven web;
    providing a DC corona discharge treatment apparatus including an anode electrically configured as a parallel device, the anode including a plurality of sets of pins, each pin within a set being spaced apart from the next nearest pin by at least 0.125 inches (0.3175 cm), each set of pins being spaced apart from the next nearest pin by at least 0.125 inches (0.3175 cm), wherein each set of pins includes four pins and wherein the pins within each set of pins being electrically connected in series;
    generating a DC corona discharge from the DC corona discharge treatment apparatus; and
    subjecting the web to the DC corona discharge to form an electret.

14. The process of claim 13, further including the step of providing an ambient atmosphere having a relative humidity between about 60% at 60 degrees F. and about 50% at 90 degrees F.

15. The process of claim 13, further including the step of providing an ambient atmosphere having a relative humidity between about 40% at 60 degrees F. and about 30% at 90 degrees F.

16. The process of claim 13, further including the step of providing an ambient atmosphere having a relative humidity between about 30% at 60 degrees F. and about 20% at 90 degrees F.

17. The process of claim 13, step of providing a nonwoven including the step of providing a high loft nonwoven web.

18. The process of claim 17, the step of providing a high loft nonwoven web including the step of providing a high loft nonwoven web having an Ames Bulk of greater than about 0.10 inches (3 mm).

19. The process of claim 17, the step of providing a high loft nonwoven web including the step of providing a high loft nonwoven web having a thickness greater than about 0.15 inches (about 4 mm).

20. The process of claim 17, the step of providing a high loft nonwoven web including the step of providing a high loft nonwoven web having a bulk density which is less than about 0.1 grams per cubic centimeter.

* * * * *